(12) United States Patent
Algüera et al.

(10) Patent No.: US 11,988,567 B2
(45) Date of Patent: May 21, 2024

(54) TRAILER LANDING GEAR HAVING A FORCE-MEASURING ELEMENT

(71) Applicant: JOST-WERKE DEUTSCHLAND GMBH, Neu-Isenburg (DE)

(72) Inventors: José Manuel Algüera, Aschaffenburg (DE); Günter Seidel, Riedstadt (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 0 days.

(21) Appl. No.: 18/551,902

(22) PCT Filed: Mar. 25, 2022

(86) PCT No.: PCT/IB2022/052774
§ 371 (c)(1),
(2) Date: Sep. 22, 2023

(87) PCT Pub. No.: WO2022/201128
PCT Pub. Date: Sep. 29, 2022

(65) Prior Publication Data
US 2024/0102872 A1    Mar. 28, 2024

(30) Foreign Application Priority Data
Mar. 25, 2021    (DE) .......................... 102021001553.3

(51) Int. Cl.
*G01L 1/22*    (2006.01)
*B60S 9/08*    (2006.01)

(52) U.S. Cl.
CPC .. *G01L 1/22* (2013.01); *B60S 9/08* (2013.01)

(58) Field of Classification Search
CPC ......... B60S 9/08; B64C 25/24; B64C 25/405;
B64C 25/60; B64C 25/00; B64C 17/02;
B64C 25/58; B64C 25/001; B64F 5/00;
B64F 1/224; G01G 19/07; G08B 21/00;
B60D 1/486; B64D 45/00; G01L 1/20;
G01M 9/062; G01M 1/125; G01M 7/06;
(Continued)

(56) References Cited

U.S. PATENT DOCUMENTS 4,552,324 A * 11/1985 Hrusch ...................... F16F 9/06
267/64.22
8,382,069 B2 * 2/2013 Alguera ...................... B66F 3/08
180/219

FOREIGN PATENT DOCUMENTS

DE    102005036139 A1    2/2007
DE    102008058937 A1    11/2009
(Continued)

*Primary Examiner* — Brandi N Hopkins
(74) *Attorney, Agent, or Firm* — Hudak, Shunk & Farine Co. LPA (57) ABSTRACT

A landing gear having a force-measuring element. The landing gear includes an outer tube, an inner tube movably mounted in the outer tube, and a transmission assembly having at least one spindle driven by a gear. The spindle is fed through a spindle opening in a spindle bearing plate which is in contact with the outer tube, and a spindle nut fastened to the inner tube is held on the spindle. The landing gear addresses the problem of providing a landing gear that allows a quantitative and reproducible measurement of the forces transmitted from the landing gear to the ground. The problem is solved in that the force-measuring element is mounted on a support component disposed in the force flow between the spindle and the outer tube.

19 Claims, 8 Drawing Sheets

(58) Field of Classification Search
CPC ....... G01M 7/08; G01B 21/24; G05D 1/0676; G06F 30/20; G06F 30/23; G06F 30/15
See application file for complete search history.

(56) References Cited

FOREIGN PATENT DOCUMENTS

| | | | | |
|---|---|---|---|---|
| DE | 102015117086 A1 | 4/2017 | | |
| DE | 102019103905 A1 | 8/2020 | | |
| EP | 1332936 A2 * | 8/2003 | ................ | B60S 9/08 |
| EP | 3293062 A1 | 3/2018 | | |

* cited by examiner

TRAILER LANDING GEAR HAVING A FORCE-MEASURING ELEMENT

FIELD OF THE INVENTION

The invention relates to a landing gear having a force-measuring element comprising an outer tube, an inner tube movably mounted in the outer tube, and a transmission assembly comprising at least one spindle driven by a gear, wherein the spindle is fed through a spindle opening in a spindle bearing plate which is in contact with the outer tube, and a spindle nut fastened to the inner tube is held on the spindle.

BACKGROUND OF THE INVENTION

Such landing gears are often attached to semi-trailers or trailers in general and support them on the ground, particularly when uncoupled from the towing vehicle. As a result, the semi-trailer maintains a stable position in its parking position and can be approached by a towing vehicle to be coupled again. In other applications, the landing gears are arranged at the rear of silo vehicles and are extended to stabilize the vehicle before the tipping process is initiated.

From DE 10 2005 036 139 A1 a landing gear comprising a pressure element and a support load indicator has become known, which shows the operator a safe position when extending the extending gears. The pressure element comprises a spring element and a switching element interacting therewith in the form of a mechanical button, the spring element being arranged between a spindle stop ring arranged in a stationary manner on the spindle and the spindle bearing plate. When the landing gear is extended, the spindle moves against the spindle bearing plate if the surface is stable, so that the spring element is deformed and the switching element is actuated. The switching element in turn is connected to a display element which indicates to the operator the presence of a loaded landing gear. However, it has proven to be disadvantageous that the spring element does not deliver reproducible values after frequent load changes and therefore triggers the switching element even if the force is applied too low.

Furthermore, the support load indicator cannot be used to make any quantitative statements about the forces transmitted by the landing gear.

SUMMARY OF THE INVENTION

Consequently, the invention was based on the object of providing a landing gear that enables a quantitative and reproducible measurement of the forces transmitted from the landing gear to the ground.

The underlying object is solved according to the invention with the features of a force-measuring element mounted on a support component disposed in the force flow between the spindle and the outer tube. With a force-measuring element integrated in the support component, it can be determined whether a trailer to be uncoupled is parked safely and, particularly in the case of a semi-trailer, the landing gears have firm contact with the ground. In addition to this qualitative determination, there is also a quantitative determination of the load acting on the landing gear. This makes it possible to determine the total weight of the trailer by recording the axle loads and thereby determine potential overloading or uneven load distribution.

A force-measuring element is understood to be a sensor that generates a signal proportional to the force introduced from a deformation of the support component. These are, for example, piezoelectric sensors that detect the change in electrical polarization and thus the occurrence of an electrical voltage on solid bodies when they are elastically deformed. Alternatively, capacitive sensors can be used as a force-measuring element.

The force-measuring element is attached to the support component, with fastening of the force-measuring element within the support component or on the surface of the support component being preferred. All fastening positions have in common that the force-measuring element is connected to the support component in such a way that it detects its deformation as precisely as possible, whereby a force-locking, material-locking and/or form-locking connection is suitable, in particular by precisely fitting clamping or an adhesive bond.

A thrust bearing of the spindle is conveniently arranged under the spindle bearing plate. The thrust bearing surrounds the spindle and ensures that the spindle is rotatably supported while at the same time supporting the spindle under pressure in the axial direction against the spindle bearing plate. However, the spindle is supported radially through the spindle opening in the spindle bearing plate.

According to a particularly useful embodiment, the thrust bearing is supported with its upper bearing section on the underside of the support component, at least when the spindle is in a loaded state. The upper bearing section of the thrust bearing is thereby arranged in a stationary manner relative to the support component, at least under load.

According to a first preferred embodiment, the support component is the spindle bearing plate. Alternatively, the support component can also be a measuring plate arranged between the upper bearing section of the thrust bearing and the spindle bearing plate. The measuring plate is, for example, shaped as a measuring ring which coaxially surrounds the spindle.

The measuring plate is preferably mounted in a rotationally fixed manner with respect to the outer tube. This results in the advantage that a connecting cable can be laid in a stationary manner.

The measuring plate can in particular have a concave or bridge-like shape with external support sections facing the spindle bearing plate and a cantilever section arranged between them. Due to this shape, there is always a free installation space for the spindle bearing plate in the area of the cantilever section, in which, for example, a force-measuring element can be inserted in a particularly protected manner. Furthermore, the concave or bridge-like shape of the measuring plate ensures greater deformation of the measuring plate in the area of the cantilever section when a force is introduced from the thrust bearing, which introduces an axially directed force centrally on the cantilever section, allowing a relatively large deformation and thus a more accurate force measurement.

The thrust bearing can rest, in particular with its lower bearing section, on a spindle stop ring that is firmly connected to the spindle. The lower bearing section is thus rotatably arranged relative to the support component and stationary relative to the spindle. When the spindle is loaded, the support component presses from below against the lower bearing section and pushes the thrust bearing with the upper bearing section against the support component, which deforms as a result of the load introduced.

The force-measuring element is expediently arranged above the thrust bearing at least partially in its projected surface. In this area, the load is introduced into the support component via the thrust bearing and the deformation measurable by the force-measuring element is at its greatest, enabling a particularly precise and reproducible determination of the introduced force.

According to a further embodiment of the invention, the force-measuring element is expediently pin-shaped and is inserted into a complementary shaped recess of the support component without play or under prestress.

An embodiment in which the pin-shaped force-measuring element is a measuring dowel is particularly useful. A measuring dowel is understood to mean a sensor that is force-sensitive in the transverse direction, which is typically designed with a cylindrical shape and is always inserted with a precise fit and/or under prestress into a complementary shaped measuring dowel bore in the component to be measured, or at least when the expected operating load is present. The pre-tensioning of the measuring dowel is realized, for example, by means of a clamping device integrated into the measuring dowel.

Preferably, the recess is a measuring dowel bore formed in the support component, into which the measuring dowel is inserted. The diameter of the measuring dowel bore is typically 6.00 mm to 10.00 mm, particularly preferably 8 mm.

The measuring dowel bore can be aligned radially to the spindle in the support component, for example. The measuring dowel bore is also preferably arranged orthogonally to an adjacent wall of the outer tube, whereby the length of the measuring dowel bore and thus the weakening of the material of the support component is as small as possible.

Conveniently, the measuring dowel bore passes over the axial bearing at least partially offset in the axial direction. This makes it possible to place the measuring dowel above the thrust bearing in an area of maximum force application.

The measuring dowel bore is expediently shaped as a blind hole and the measuring dowel is inserted into the deepest part of the blind hole. This results in a particularly protected mounting position for the measuring dowel.

According to a further, alternative embodiment, the force-measuring element is a strain gauge application. The strain gauge application is used to record stretching and compressing deformations of the supporting component. It changes its electrical resistance even with small deformations and is used as a strain sensor. Typically, the strain gauge application is glued to the support component that deforms minimally under load. Its deformation (elongation) under load then leads to a change in the electrical resistance of the strain gauge application.

It is preferred to attach the strain gauge application to an upper surface and/or underside of the support component. This results in the advantage, on the one hand, that no weakening of the support component through drilling or milling has to be carried out and, on the other hand, that there is a maximum expansion or compression on the upper surface and underside of the support component and, as a result, particularly precise and reproducible measured values can be achieved.

The force-measuring element is advantageously a pressure sensor arranged between the measuring plate and the spindle bearing plate. A pressure sensor belongs to the group of pressure measuring devices, which, as the first link in a measuring chain, convert the physical quantity of pressure (force per area) into an electrical output quantity as a measure of the pressure. A piezoresistive or piezoelectric, capacitive or inductive pressure sensor as well as a pressure sensor with a Hall element are particularly suitable.

A particularly useful embodiment of the invention can provide that the pressure sensor is arranged on the cantilever section of the concave or bridge-like measuring plate in such a way that a force shunt occurs via the pressure sensor to the spindle bearing plate. This has the advantage that the pressure sensor does not have to transmit the entire power flow of the landing gear and is therefore largely protected against overload. The spectrum of forces to be transmitted is also small, so that a pressure sensor with a narrower measuring range can be used, which in turn provides more precise measured values.

BRIEF DESCRIPTION OF THE DRAWINGS

For better understanding, the invention is explained in more detail below using 9 Figures showing in FIG. 1: a longitudinal section through a landing gear according to a first embodiment with a pin-shaped force-measuring element in a spindle bearing plate.

DETAILED DESCRIPTION OF THE INVENTION

Figure 1:
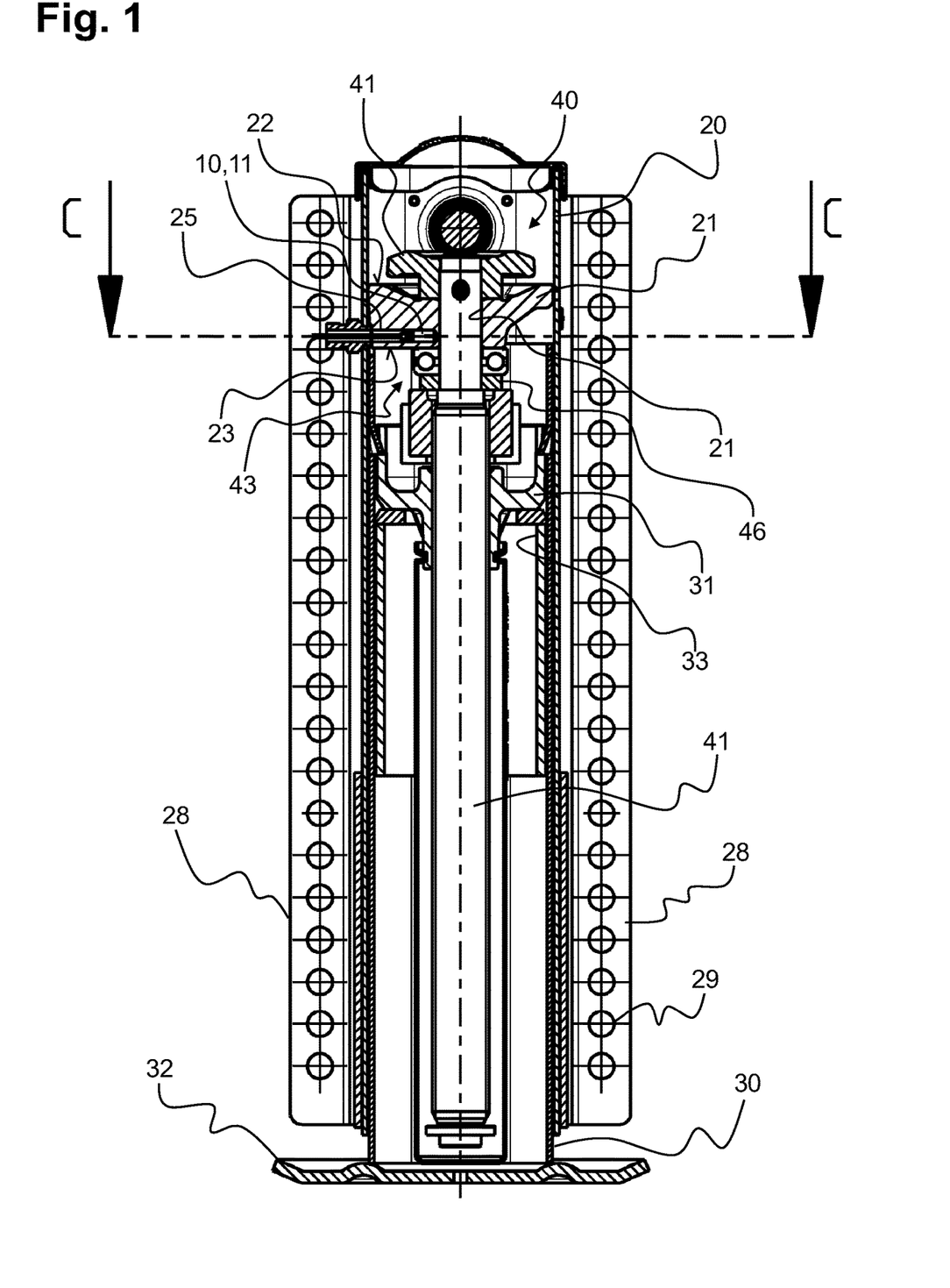

FIG. 1 shows a longitudinal section of a landing gear with an outer tube 20 in the form of a square profile and an axially guided inner tube 30. Due to the complementary profile shape of the outer and inner tubes 20, 30, the inner tube 30 is held in the outer tube 20 in a rotationally fixed manner in the circumferential direction.

For fastening the landing gear to a vehicle, a mounting flange plate 28 protrudes on both sides of the outer tube 20, in which mounting holes 29 are made at discrete intervals. The inner tube 30 carries a support foot 32 at its lower end, with which the landing gear stands on the ground when the inner tube 30 is extended.

In the outer tube 20 there is a transmission assembly 40 with a spindle 42 which is rotatably mounted relative to the outer tube 20 and a gear 41 which is connected to the spindle 42 in a rotationally fixed manner at an upper end section. The transmission assembly 40 is rotated in particular by a gear set 49 shown in FIG. 4 and a transmission input shaft 47. By rotating the spindle 42, a spindle nut 31 firmly inserted into an upper section 33 of the inner tube 30 moves either downwards or upwards, depending on the direction of rotation. When the spindle nut 31 moves downward, it presses the inner tube 30 and the support foot 32 attached to it towards the ground and the landing gear is extended. When the spindle nut 31 moves upwards, it lifts the inner tube 30 together with the support foot 32 and the landing gear is retracted.

The spindle 42 passes through a spindle bearing plate 21 arranged under the gear 41, the spindle bearing plate 21 being formed with a spindle opening 24 whose inner diameter is selected to be only slightly larger than the outer diameter of the spindle 42. With the help of the spindle bearing plate 21 and the spindle opening 24, the spindle 42 is supported in its radial direction. The spindle bearing plate 21 is firmly connected to the inner wall of the outer tube 20 on at least three sides, preferably on four sides. The spindle bearing plate 21 is aligned essentially orthogonally to the extent of the outer tube 20. The spindle 42 and the associated spindle opening 24 in the spindle bearing plate 21 are housed centrally in the outer tube 20.

A thrust bearing 43 is slid onto the spindle 42 under the spindle bearing plate 21, which in turn is adjacent to a spindle stop ring 46. As soon as the support foot 32 stands on the ground, the spindle stop ring 46 pushes the thrust bearing 43 upwards until it comes into contact with an underside 23 of the spindle bearing plate 21.

A recess 25, in particular a measuring dowel bore 25, which is aligned transversely to the spindle 42 and which also extends through the outer tube 20 at its end facing away from the spindle 42, is inserted into the spindle bearing plate 21. The recess 25 can be seen particularly well in the same type of landing gear in FIG. 2 as a view of the sectional plane CC according to FIG. 1 and in an enlarged view in FIG. 3. In the exemplary embodiment, the recess 25 is designed as a blind hole 26, the deepest part 27 of which is arranged in the spindle bearing plate 21 in close proximity to the spindle opening 24. In this exemplary embodiment, the recess 25 runs parallel to the mounting flange plates 28 and is therefore aligned in or against the direction of travel in the case of the landing gear being mounted on a vehicle.

Figure 2:
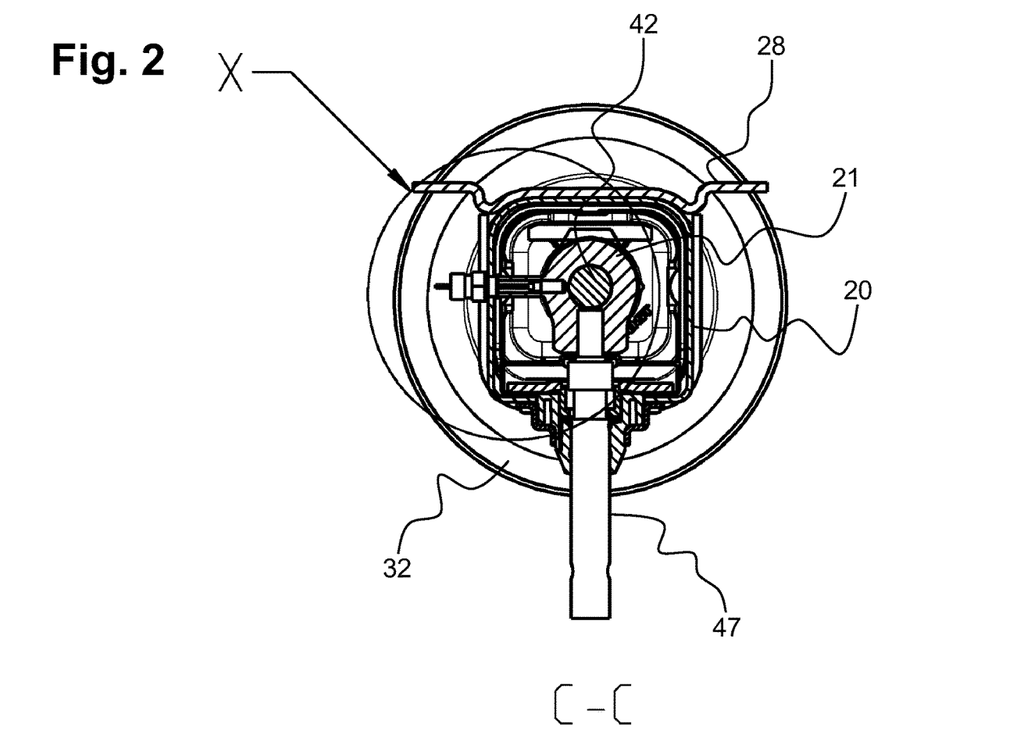
FIG. 2: a cross section through the landing gear according to FIG. 1 in the section plane CC.
Figure 3:
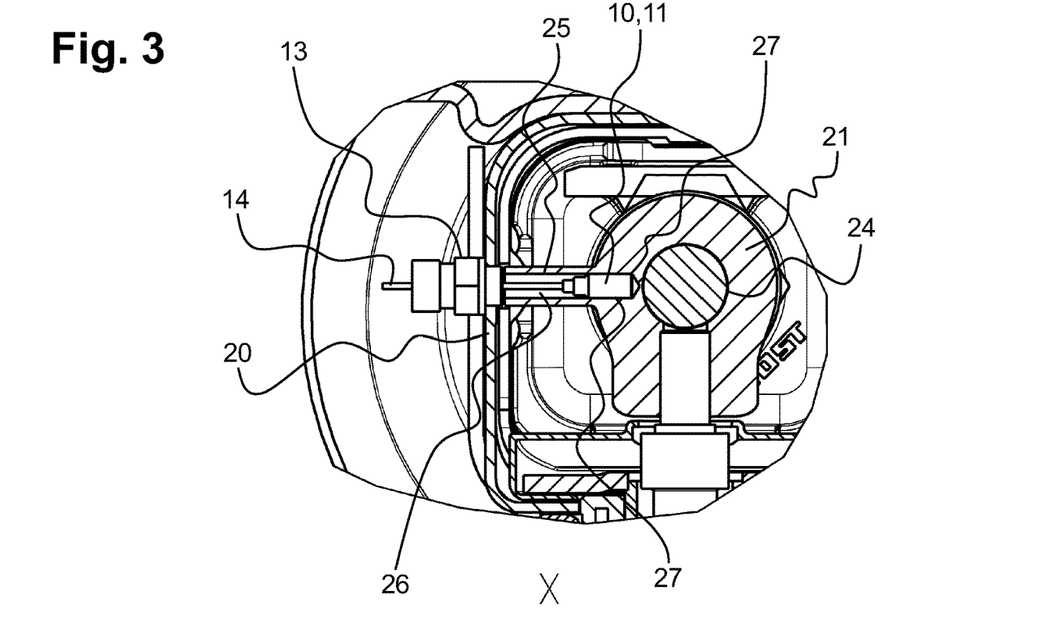
FIG. 3: an enlarged section of the detail X in FIG. 2.

A pin-shaped force-measuring element 10, in particular in the form of a measuring dowel 11, is inserted in a stationary manner into the recess 25 and clamped within the measuring dowel bore 25 with respect to the spindle bearing plate 21. The position of the measuring dowel 11 shown as an example is in the area of the deepest part 27 and thus in a projected surface above the thrust bearing 43. When the inner tube 30 is extended relative to the outer tube 20 and the support foot 32 is standing on the ground, a flow of force takes place from the support foot 32 via the inner tube 30, the spindle nut 31, the spindle 42 and the thrust bearing 43 into the spindle bearing plate 21. Since the spindle bearing plate 21 is non-positively connected to the outer tube 20 at its edge region, the relatively greatest deformation occurs in the region of the spindle bearing plate 21 above the thrust bearing 43 and thus the most precise possible measurement of this deformation by means of the measuring dowel 11, the measured value of which can be assigned to a corresponding support load.

The measuring dowel bore 25, which is arranged as an example within the spindle bearing plate 21, also continues in an aligned extension in the outer tube 20. A transition coupling 13 is inserted into an open end of the measuring dowel bore 25, with the help of which the measuring dowel bore 25 is closed to the outside and through which only a connecting cable 14 is led out of the measuring dowel bore 25. Via the connecting cable 14, the measuring dowel 11 is electrically connected to an on-board network of a vehicle, not shown here, from which the measuring dowel 11 is supplied with electrical energy. In addition, the measuring dowel 11 provides force measurement signals to the vehicle via the connecting cable 14.

Figure 4:
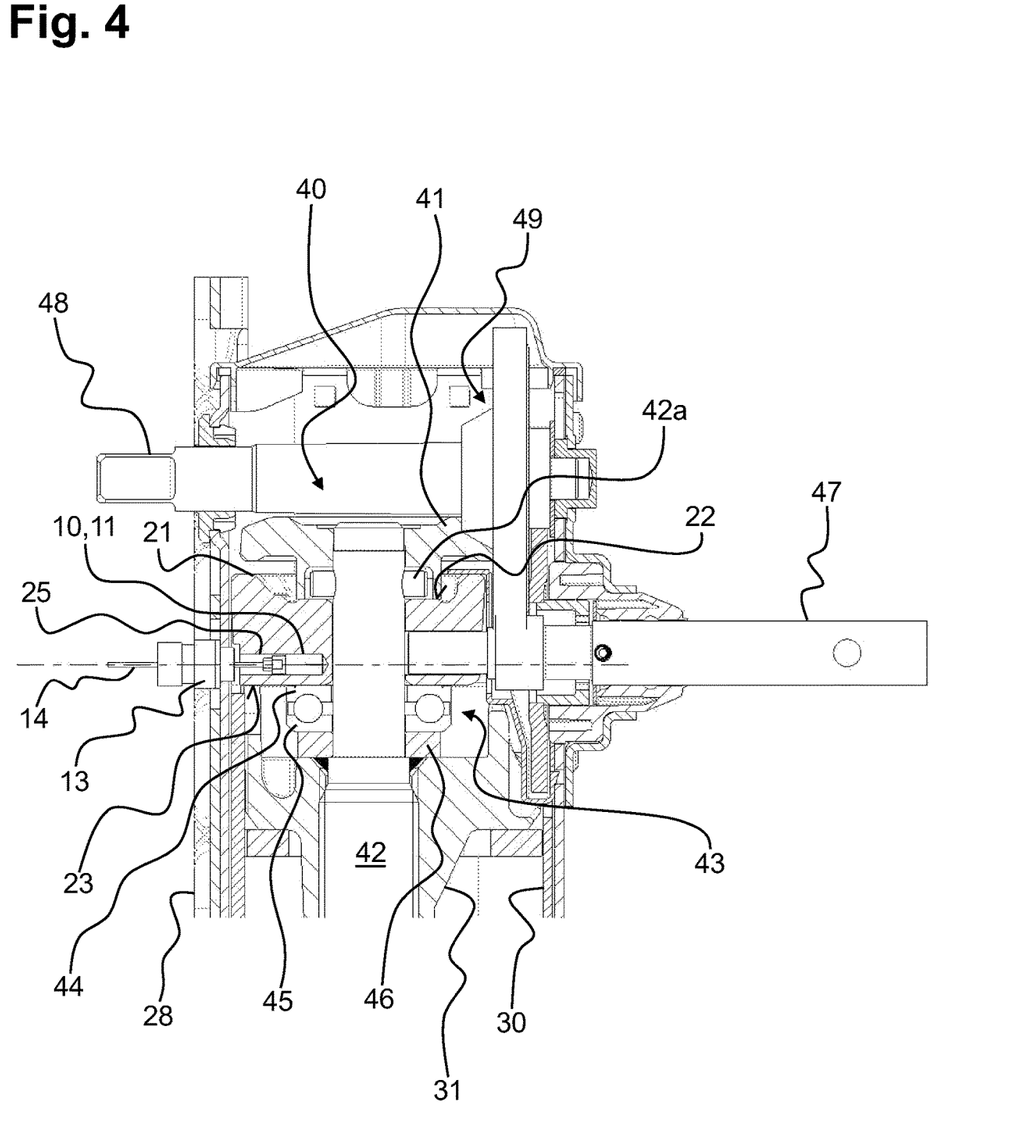
FIG. 4: a longitudinal section through the upper section of a landing gear according to a second embodiment with a pin-shaped force-measuring element in the spindle bearing plate.

FIG. 4 shows an alternative embodiment in which the measuring dowel bore 25 is arranged offset by 90° in the spindle bearing plate 21 and the outer tube 20 and breaks through the outer tube 20 on the back between the mounting flange plates 28.

For extending or retracting, the landing gear has the transmission input shaft 47, with which in particular a crank, not shown, can be connected in a rotationally fixed manner. With the help of the crank, an operator can set the transmission input shaft 47 in rotation, whereby the inner tube 30 with the support foot 32 either extends or retracts depending on the direction of rotation. In the illustration in FIG. 4, the inner tube 30 is in a retracted position relative to the outer tube 20.

The transmission input shaft 47 transmits the torque to the gear set 49, which meshes with the gear 41 of the transmission assembly 40 and also engages a transmission output shaft 48. The transmission input shaft 47 and the transmission output shaft 48 are aligned axially parallel to one another. The recess 25 or measuring dowel bore 25 also runs parallel to the transmission input shaft 47 and the transmission output shaft 48.

The thrust bearing 43 of the spindle 42 is constructed in two parts and includes an upper bearing section 44 which is arranged adjacent to the underside 23 of the spindle bearing plate 21. When the inner tube 30 is retracted into the outer tube 20, a gap may be formed between the upper bearing section 44 and the underside 23 of the spindle bearing plate 21 due to the dead weight of the inner tube 30 and support foot 32, since in this retracted position the spindle 42 is supported in a hanging manner on an upper surface 22 of the spindle bearing plate 21 by means of its securing bolt 42a.

With the inner tube 30 extended and a support foot 32 resting on the ground, the spindle 42 is pushed upward and the spindle stop ring 46, which is fixedly formed on the spindle 42, abuts against a lower bearing section 45 of the thrust bearing 43. With the help of the thrust bearing 43, force is transmitted to the upper bearing section 44, which is pressed against the underside 23 of the spindle bearing plate 21 and rests against it.

At the same time, the thrust bearing 43 allows the spindle 42 to rotate further even when the landing gear is under pressure.

The measuring dowel bore 25 running radially towards the spindle 42, is aligned and dimensioned in such a way that the measuring dowel 11 clamped therein is arranged above the thrust bearing 43 and thus as close as possible to the force application point of the forces transmitted from the spindle 42 into the spindle bearing plate 21.

Figure 5:
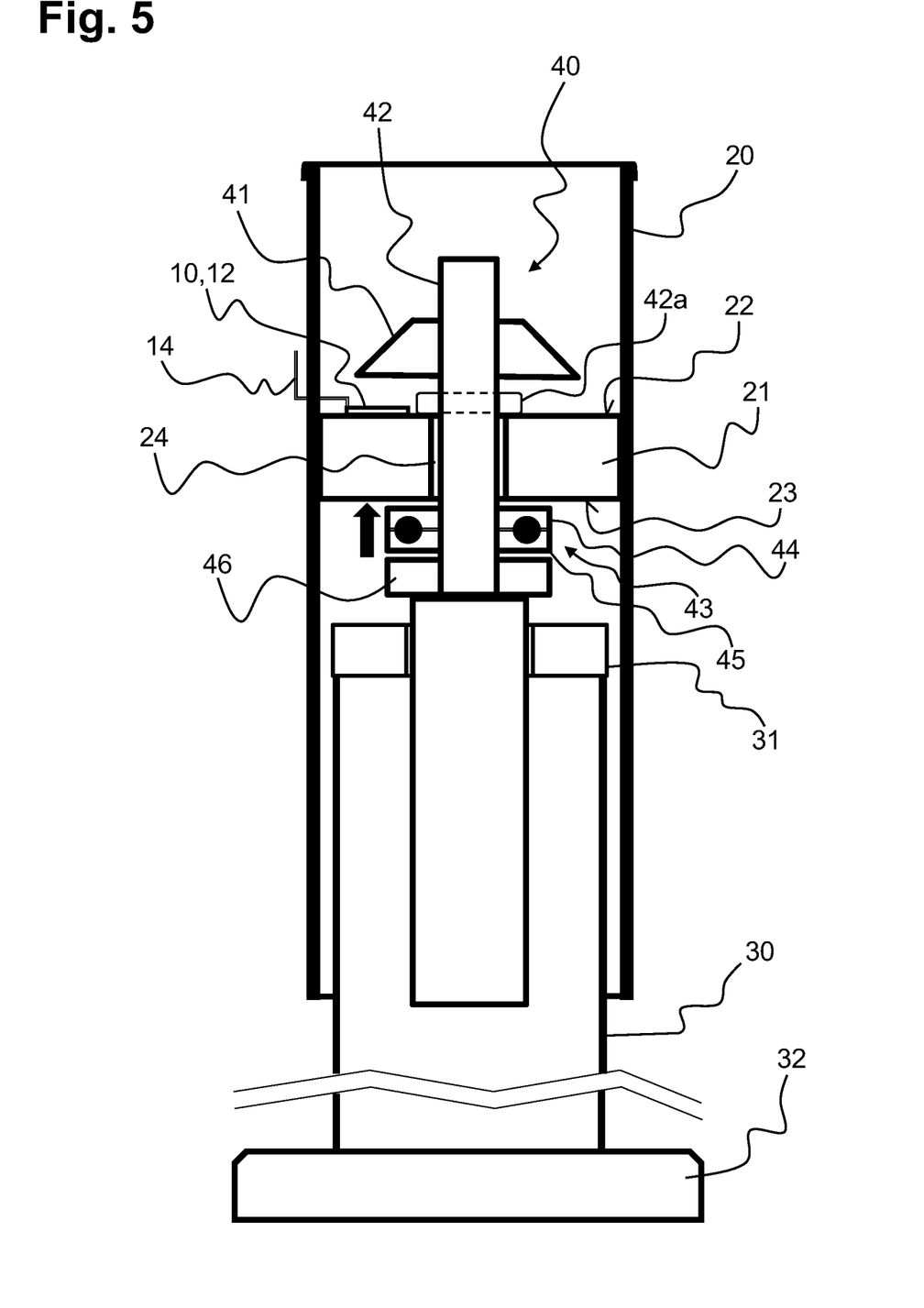
FIG. 5: a longitudinal section through a schematically illustrated landing gear with a strain gauge application as a force-measuring element on the spindle bearing plate.

FIG. 5 shows an alternative embodiment with a force-measuring element 10 in the form of a strain gauge application 12. The strain gauge application 12 is applied to the upper surface 22 of the spindle bearing plate 21 and at least partially overlaps with the thrust bearing 43 arranged underneath, via which a compressive force in the direction of the arrow is transmitted to the spindle bearing plate 21 when the support foot 32 is standing on the ground. As a result, a large part of the deformation of the spindle bearing plate 21 takes place in an area of the strain gauge application 12, which makes a particularly precise force measurement possible.

The strain gauge application 12 can be connected to the energy and data system of a vehicle by means of a connecting cable 14.

Figure 6:
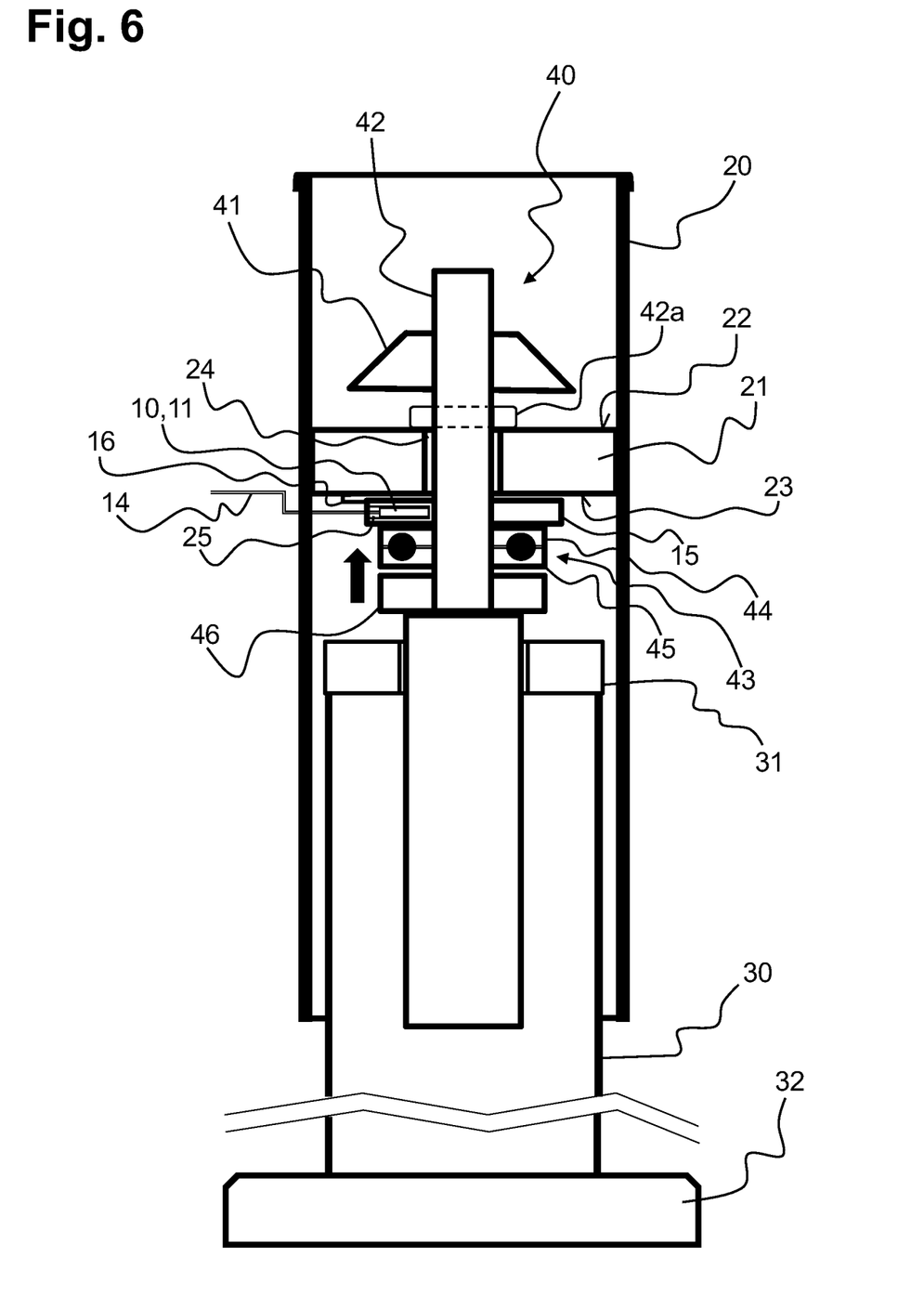
FIG. 6: a longitudinal section through a schematically illustrated landing gear with a pin-shaped force-measuring element in a measuring plate.

FIG. 6 shows a further exemplary embodiment in which a measuring plate 15 is inserted between the thrust bearing 43 of the spindle 42 and the spindle bearing plate 21 attached to the outer tube 20. The measuring plate 15 is provided with a central bore for receiving the spindle 42 and is designed with a closed ring shape. When the landing gear is extended and loaded, the measuring plate 15 experiences a compressive force from the spindle 42 moving upward in the direction of the arrow, which presses the measuring plate 15 against the underside 23 of the spindle bearing plate 22 via the spindle stop ring 46 and the thrust bearing 43. The spindle bearing plate 22 ensures that force is transmitted to the outer tube 20 and from there to the vehicle via the mounting flange plate 28 (see FIG. 1).

The measuring plate 15 has a recess 25, in particular a measuring dowel bore 25, into which a pin-shaped force-measuring element 10, in particular a measuring dowel 11, is inserted as a force-measuring element 10. The recess 25 is aligned radially to the spindle 42 and the pin-shaped force measuring element 10, in particular the measuring dowel 11, is located above the thrust bearing 43 of the spindle 42, which transmits the forces into the measuring plate 15 when the landing gear is loaded.

In order to prevent the measuring plate 15 from rotating together with the spindle 42, the measuring plate 15 is connected to the spindle bearing plate 21 in a rotationally fixed manner via a measuring plate holder 16. As a result, the measuring plate 15 is held in a rotationally fixed manner relative to the outer tube 20 and the connecting cable 14 can be led out of the outer tube 20 at a predetermined position without movable cables.

Figure 7:
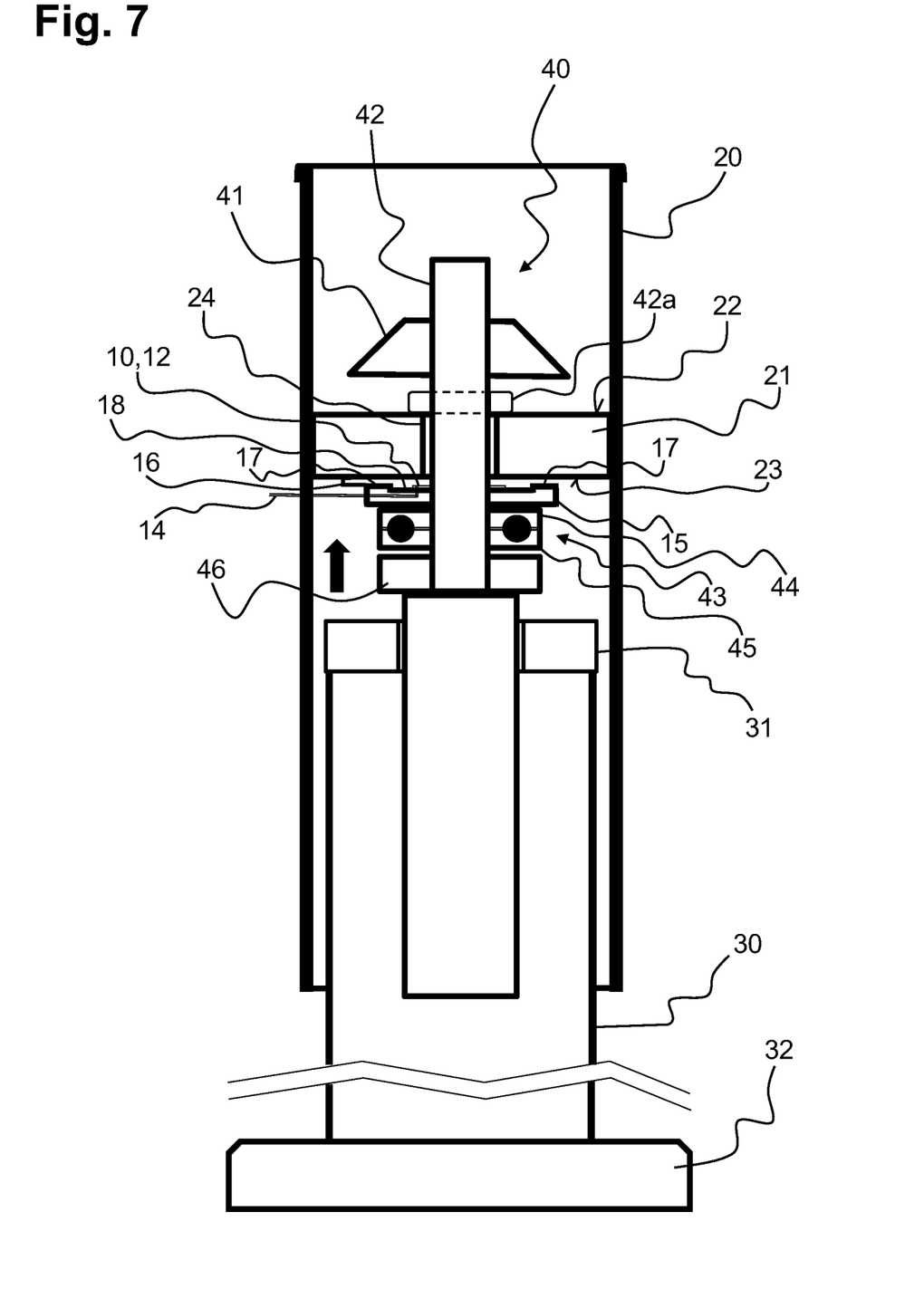
FIG. 7: a longitudinal section through a schematically illustrated landing gear with a strain gauge application as a force-measuring element on a measuring plate.

FIG. 7 shows a further exemplary embodiment with a measuring plate 15, which is provided with a strain gauge application 12. The measuring plate 15 is designed with a concave or bridge-like shape and, in the event of a load, is supported only in its lateral edge region by means of support sections 17 on the underside 23 of the spindle bearing plate 21. The cantilever section 18 located between the support sections 17 is always arranged at a distance from the underside 23 of the spindle bearing plate 21, regardless of the load on the thrust bearing 43, and carries the strain gauge application 12, which cannot collide with the spindle bearing plate 21 due to this installation location.

It is also possible to design the measuring plate 15 with the force-measuring element 10 as a particularly thinly configured measuring film. Here too, the measuring plate 15 is located in the force flow between the thrust bearing 43 and the outer tube 20 in order to be able to measure any forces there.

Figure 8:
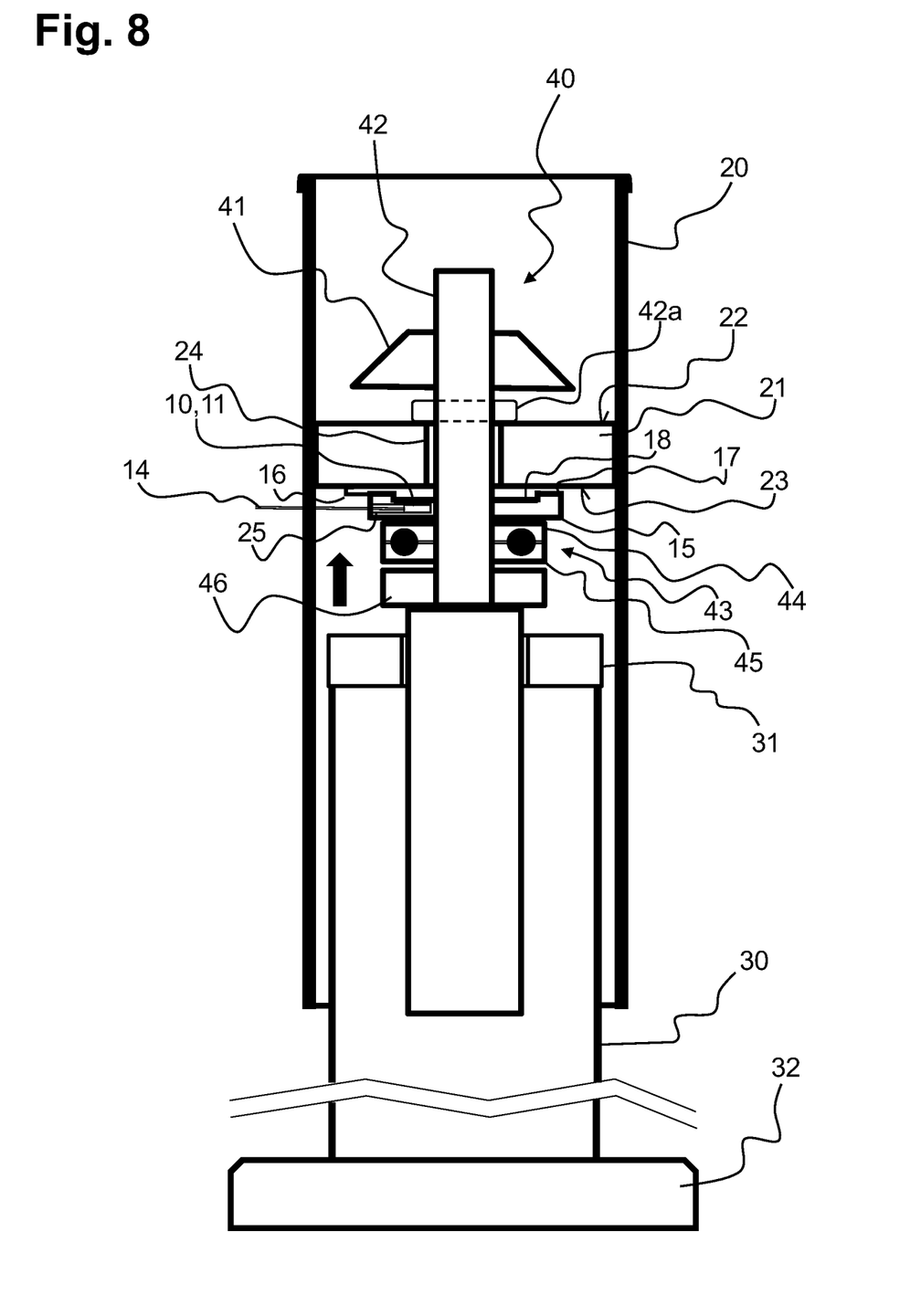
FIG. 8: a longitudinal section through a schematically illustrated landing gear with a concave or bridge-like measuring plate and a force-measuring element inserted therein

FIG. 8 shows a further exemplary embodiment with a concave or bridge-like shape of the measuring plate 15, the rising support sections 17 of which protrude in the direction of the spindle bearing plate 21 relative to the cantilever section 18 arranged between them. A recess 25 which tapers radially towards the spindle 42 is formed in the measuring plate 15, in particular a measuring dowel bore 25, into which a pin-shaped force-measuring element 10, in particular a measuring dowel 11, is inserted. The force-measuring element 10 is located in an area of the cantilever section 18 of the measuring plate 15, which is subject to a larger, reversible deformation when the landing gear is loaded compared to the support sections 17 and enables a particularly precise measurement.

Figure 9:
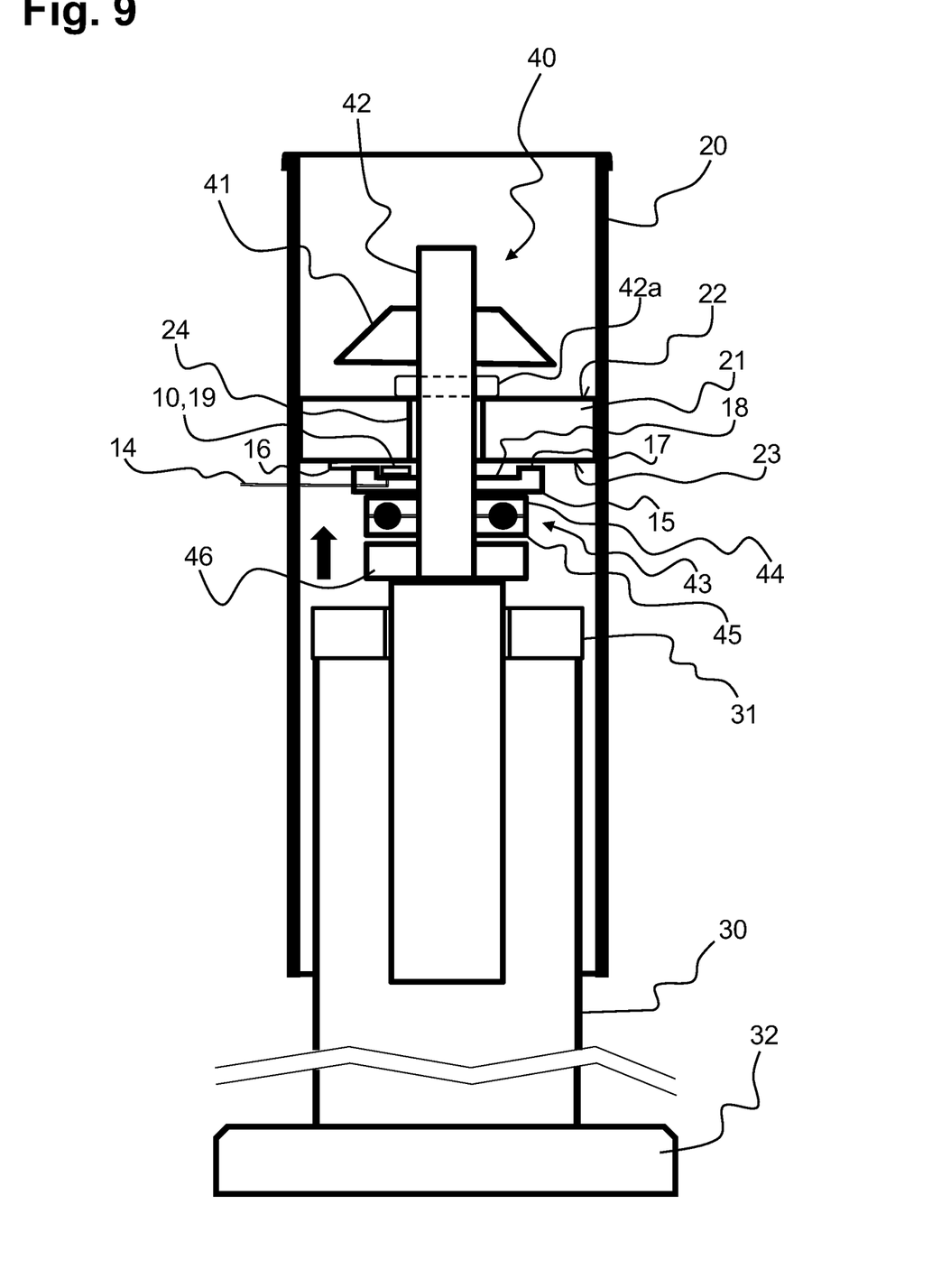
FIG. 9: a longitudinal section through a schematically illustrated landing gear with a concave or bridge-like measuring plate and a pressure sensor arranged between the cantilever section and the spindle bearing plate.

FIG. 9 shows a landing gear according to the invention according to an alternative embodiment with a likewise concave or bridge-like measuring plate 15. However, a pressure sensor 19 is used as the force-measuring element 10, which is arranged on a side of the cantilever section 18 facing the spindle bearing plate 21. The pressure sensor 19 closes on its upper side with the support sections 17 of the measuring plate 15 and, when the landing gear is loaded, rests together with the support sections 17 on the underside 23 of the spindle bearing plate 21, so that there is a force shunt and the pressure sensor 19 is applied with only a part of the total the force transmitted from the thrust bearing 43 to the spindle bearing plate 21.

LIST OF REFERENCE NUMERALS 10 force-measuring element
11 pin-shaped force-measuring element, measuring dowel
12 strain gauge application
13 transition coupling
14 connecting cable
15 measuring plate
16 measuring plate holder
17 support section(s) measuring plate
18 cantilever section measuring plate
19 pressure sensor
20 outer tube
21 spindle bearing plate
22 upper surface spindle bearing plate
23 underside of spindle bearing plate
24 spindle opening spindle bearing plate
25 recess, measuring dowel bore
26 blind hole
27 deepest part of blind hole
28 mounting flange plate
29 mounting holes
30 inner tube
31 spindle nut
32 support foot
33 upper section of inner tube
40 transmission assembly
41 gear
42 spindle
42a securing bolt
43 thrust bearing spindle
44 upper bearing section
45 lower bearing section
46 spindle stop ring
47 transmission input shaft
48 transmission output shaft
49 gear set

What is claimed is:

1. A landing gear having a force-measuring element, the landing gear comprises an outer tube, an inner tube movably mounted in the outer tube, and a transmission assembly comprising at least one spindle driven by a gear, wherein the spindle is fed through a spindle opening in a spindle bearing plate which is in contact with the outer tube, and a spindle nut fastened to the inner tube is held on the spindle,
   wherein the force-measuring element is mounted on a support component disposed in the force flow between the spindle and the outer tube.

2. The landing gear according to claim 1, wherein a force is detected by means of the force-measuring element as a function of the deformation of the support component.

3. The landing gear according to claim 1, wherein a thrust bearing of the spindle is arranged under the spindle bearing plate.

4. The landing gear according to claim 3, wherein the thrust bearing is supported under load with its upper bearing section on the underside of the support component.

5. The landing gear according to claim 4, wherein the support component is a measuring plate arranged between the upper bearing section of the thrust bearing and the spindle bearing plate.

6. The landing gear according to claim 5, wherein the measuring plate is mounted in a rotationally fixed manner with respect to the outer tube.

7. The landing gear according to claim 5, wherein the measuring plate has a concave or bridge-like shape with external support sections facing the spindle bearing plate and a cantilever section arranged between them.

8. The landing gear according to claim 3, the thrust bearing rests with its lower bearing section on a spindle stop ring which is firmly connected to the spindle.

9. The landing gear according to claim 3, wherein the force-measuring element is arranged above the thrust bearing at least partially in its projected surface.

10. The landing gear according to claim 1, wherein the support component is the spindle bearing plate.

11. The landing gear according to claim 1, the force-measuring element is pin-shaped and is inserted into a complementary shaped recess of the support component without play or under tension.

12. The landing gear according to claim 11, wherein the pin-shaped force-measuring element is a measuring dowel.

13. The landing gear according to claim 11, wherein the recess is a measuring dowel bore formed in the support component, into which the measuring dowel is inserted.

14. The landing gear according to claim 13, wherein the measuring dowel is mechanically braced in the measuring dowel bore.

15. The landing gear according to claim 13, wherein the measuring dowel bore is aligned radially to the spindle.

16. The landing gear according to claim 1, wherein the force-measuring element is a strain gauge application.

17. The landing gear according to claim 16, wherein the strain gauge application is applied to an upper surface and/or an underside of the support component.

18. The landing gear according to claim 5, wherein the force-measuring element is a pressure sensor arranged between the measuring plate and the spindle bearing plate.

19. The landing gear according to claim 18, wherein the pressure sensor is arranged at the cantilever section of the measuring plate in such a way that a force shunt occurs via the pressure sensor onto the spindle bearing plate.

* * * * *